April 1, 1958     R. W. SAMSEL     2,828,626
DYNAMIC BALANCE SYSTEM
Filed Aug. 31, 1953     2 Sheets-Sheet 1
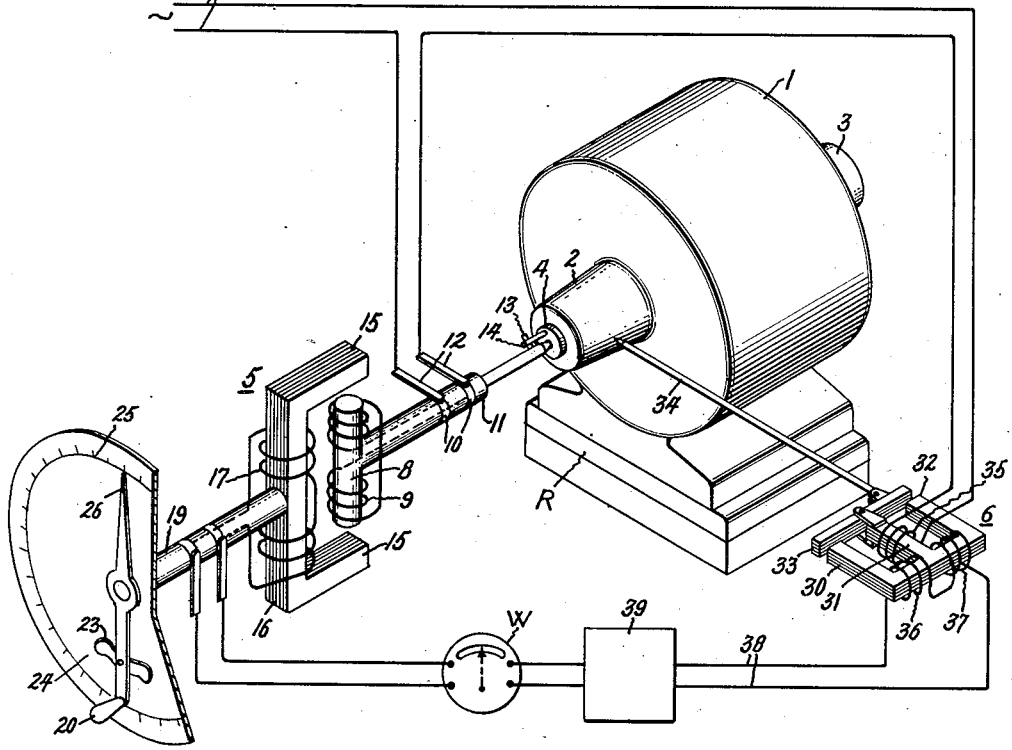
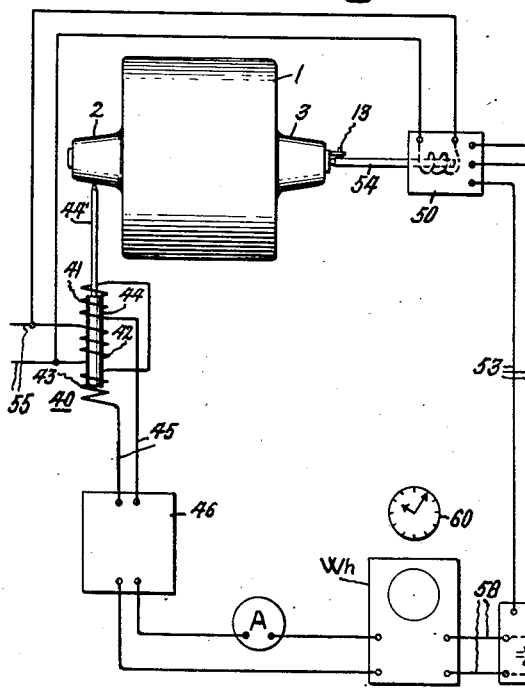
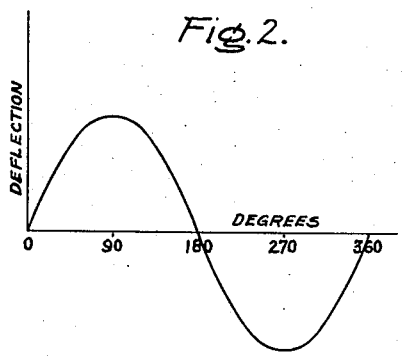
Inventor
Richard W. Samsel,
by Merton O. Morse
His Attorney.

April 1, 1958 R. W. SAMSEL 2,828,626
DYNAMIC BALANCE SYSTEM
Filed Aug. 31, 1953 2 Sheets-Sheet 2
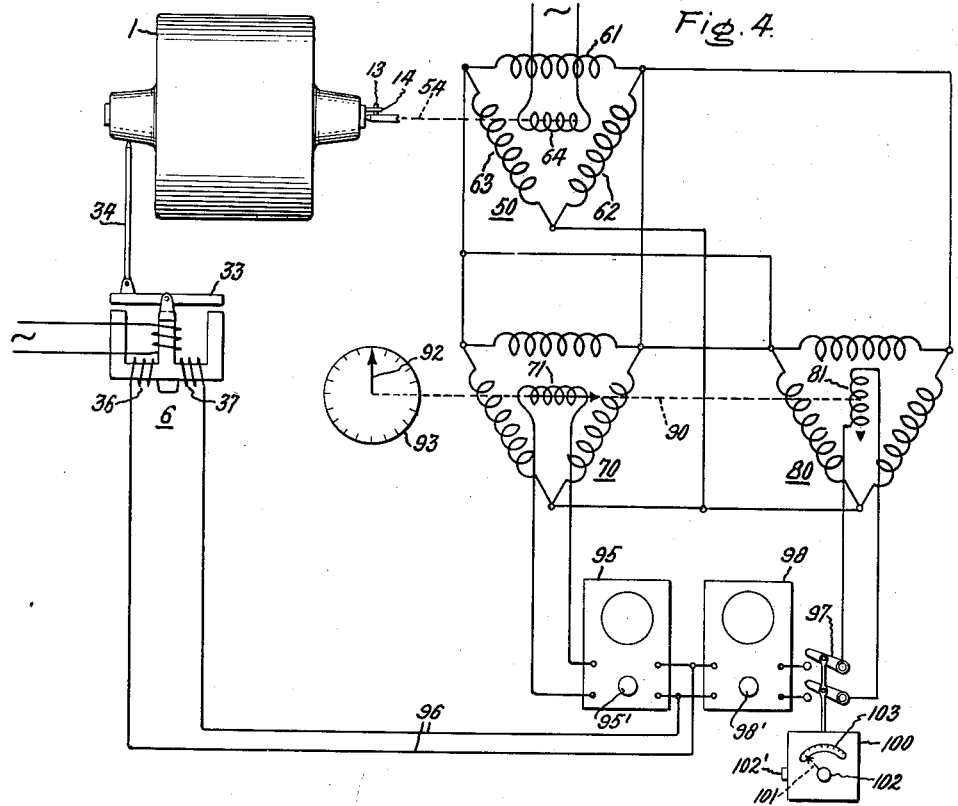
Inventor:
Richard W. Samsel
by Merton D. Moore
His Attorney

United States Patent Office 2,828,626
Patented Apr. 1, 1958

2,828,626

DYNAMIC BALANCE SYSTEM

Richard W. Samsel, Scotia, N. Y., assignor to General Electric Company, a corporation of New York Application August 31, 1953, Serial No. 377,310

15 Claims. (Cl. 73—463)

My invention relates to systems for use in determining dynamic unbalance in rotating machinery.

It has for one of its objects to provide such a system, the operation, accuracy, and reliability of which is substantially independent of the rate of rotation of the rotating element, the dynamic unbalance of which is to be determined over a wide range of such rates of rotation.

In the construction and installation of heavy machinery such as turbines and turbogenerators the rotating element, or rotor, may weigh many tons such that it is dangerous and impractical to rotate it at greater than very low speeds without first effecting its dynamic balance. To this end my invention has for one of its objects to provide means to indicate such dynamic unbalance at very low speeds of rotation.

It is a further object to provide such a system capable also of use in indicating unbalance over a very wide range of speeds, including very high rotational speeds.

A further object of my invention is to provide such an unbalance indication system having high sensitivity and which is capable of detecting and indicating both the direction and amount of extremely small unbalances.

It is a further object of my invention to determine such unbalances in the presence of extraneous influences and vibrations even at very low speeds of rotation of the rotating element.

In carrying my invention into effect a source of preferably sinusoidal electromotive force is employed, the voltage of which is supplied to two modulators. One of these modulators modulates the amplitude of the supplied voltage in accord with the angular position of the rotating element. The other modulator modulates the amplitude of the supplied voltage in accord with the vibration of the rotating element produced by the unbalance to be measured.

The output from these two modulators is then supplied to a suitable indicating device such as one having the mechanism of a wattmeter, or watt-hour meter, the operation and indication of which is dependent on a predetermined relation between the two currents supplied thereto.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention; Fig. 2 represents a graph pertaining to its operation; Fig. 3 illustrates a modification thereof in which the indication is produced by means of a watt-hour meter; Fig. 4 represents a further modification for more readily determining the direction and magnitude of the unbalance; Fig. 5 is a modification of the arrangement shown in Fig. 4, and Fig. 6 illustrates several modifications of the arrangement of Fig. 1.

Referring to Fig. 1 of the drawing, I have indicated by the numeral 1 a dynamoelectric machine having bearings 2 and 3 in which are supported a shaft 4 of the rotor of the dynamoelectric machine.

It will, of course, be understood that this illustration is solely by way of example and for convenience in illustration, since my invention is applicable to any type of rotating apparatus and is particularly adaptable to determining the unbalance of the rotors of steam turbines, or of the rotating elements of turbogenerators, etc. which may be driven thereby and which may be of extremely large size and power rated capacity.

The machine 1 is preferably supported on a suitable flexible support which, in the drawing, I have represented, again for convenience in illustration, as a rubber pad R. Any of the usual means for flexibly mounting the apparatus being tested for dynamic unbalance may be used.

The instrumentalities illustrated provide means for determining the dynamic unbalance of the rotor which comprises the shaft 4. To this end two modulators 5 and 6 are employed, both of which are of the magnetic induction type having input windings supplied with alternating current from a suitable source which may be connected to the line 7. Preferably this voltage is sinusoidal and it may be of any desired frequency in cycles per second, such as the standard 60-cycle per second frequency obtained from a public utility distribution system. It is desirable, however, that this frequency be higher than the rotational speed in revolutions per second of the machine during the test.

The magnetic induction device 5 comprises a rotor 8 having a winding 9 thereon, the terminals of which are connected to the line 7 through slip rings 10 on the shaft 11 of the rotor, and brushes 12 which ride upon the slip rings. The end of this shaft is cone shaped and adapted to engage a similarly shaped cavity in the center of the end of shaft 4 and it is provided with a dog 13 which is engaged by a pin 14 in the end of the shaft thereby to drive the rotor 8 as a unit with shaft 4.

The rotor 8 is positioned between the two arms 15 of a magnetic U-shaped yoke 16 having on it a winding 17 in which an alternating voltage is induced by the voltage impressed upon the rotor winding 9 due to the transformer action between the rotor winding and the stator winding 17.

The yoke 16 and winding 17 comprise the stator of the induction modulator but they are mounted to be rotatable in position about the rotor 8. To this end the yoke 16 is carried on a shaft 19 provided with a handle 20 by which it may be moved to any desired angular position. When adjusted in any desired position the stator is retained in that position by any suitable means, one such means being shown for illustration purposes only, as comprising the friction member 23 attached to handle 20 and which bears resiliently against the surface 24 through which shaft 19 projects. The surface 24 may be provided with a calibration 25 about a circumference having the shaft 19 at its center to cooperate with an index member 26 carried by the shaft thereby accurately to determine the angular position of the stator.

Assuming the rotor and stator to be in the positions shown, the voltage induced in stator winding 17 is maximum and of a definite phase. If the rotor is rotated to a position at right angles to the position illustrated, this voltage is substantially zero and when it is in a position 180° from the position illustrated, this voltage is again maximum but in opposite phase relation with the voltage originally produced. Thus the output voltage in the winding 17 is modulated in amplitude in accord with the position of the rotor and the phase of the voltage reverses during each successive half cycle of the modulation. This voltage in the winding 17 is supplied to one of the windings of a suitable indicating instrument W which may comprise the mechanism of a simple wattmeter.

The modulator 6 may comprise an E-shaped core having three legs 30, 31, and 32 and having an armature 33 which is pivotally supported at the end of leg 31 and which bridges the ends of legs 30 and 32. This armature 33 is biased in any suitable way, not shown, to a median position in which its ends are displaced somewhat from the ends of the respective legs 30 and 32. One end of the armature 33 carries a probe or shaft 34, the opposite end of which bears against the bearing 2 against which it presses by reason of the spring bias, not shown, to which the armature 33 is subjected. If desired, probe 34 may be attached to the bearing 2. In this way the armature 33 is vibrated in accord with the vibrations of the bearing 2 which are produced by the dynamic unbalance of the rotor supported therein, and in so vibrating it varies substantially equally and in opposite sense the reluctance of the gaps between the respective ends of the armature and the corresponding legs 30 and 33 of the core of modulator 6.

Alternating voltage from the line 7 is supplied to a winding 35 on the middle leg 31 of the core. The opposite legs 30 and 32 are provided with windings 36 and 37 which are wound in opposite directions so that when the armature 33 is in its median position the voltage in the two windings 36 and 37 are equal and in opposite phase and no voltage appears between conductors 38.

During vibration of the armature 33, however, the voltage in one of these windings increases and that in the other decreases in accord with the vibration of the armature thereby producing a voltage across the two windings and, hence, between conductors 38 which have a phase and amplitude dependent upon the vibration of the bearing 2. This voltage is supplied to the other winding to the indicating instrument W which, as previously stated, may be a wattmeter.

If desired, an amplifier 39 may be employed to increase the intensity of the voltage due to the vibration of the bearing before it is supplied to the indicating instrument thereby to increase the sensitivity of the apparatus.

The indicating instrument W is one capable of producing a deflection of its index member over a scale, which deflection is proportionate to the product of the current in one of its two coils and the component of the current in the other coil that is in phase with the current of the first coil. Since this is characteristic of the usual wattmeter, such an instrument serves entirely satisfactorily in the system as thus described to indicate the dynamic unbalance of the rotor. It is preferable that the instrument be one in which the index is normally at the middle position corresponding to zero reading and in which the index deflects from that position in either direction dependent upon the phase relations between the currents in its two windings.

With the system as thus described, in normal operation a zero reading of instrument W indicates the absence of any component of unbalance in the radial plane of bearing 2 at the angle corresponding to the position of stator 16. Any unbalance of the rotor which produces vibration of bearing 2 in said plane and at said angle produces a deflection of the index of the meter W. The operator may then adjust the position of stator 16 of modulator 5, as by handle 20, until the deflection of meter W is maximum and thus determine the angle in the radial plane of bearing 2 in which the unbalance is maximum and from scale 25 he may determine the exact angle of such unbalance.

The operator may then attach modulator 6 by means of probe 34 to bearing 3 and make the same determinations of unbalance in the plane of that bearing. These determinations enable him to effect the usual measures to correct the unbalance.

These tests, or measurements, may be effected with the rotor under test rotating at very low speeds, as is necessary with heavy machinery. In the event that several corrections of unbalance are required following successive measurements, the tests may be made at successively higher speeds until complete and satisfactory dynamic balance is effected at the normal operating speed of the machine.

A further understanding of my invention, and of its advantages, may be had from the following more theoretical consideration of its operation:

The current which flows in the two input coils of the modulators 5 and 6 may be expressed by the equation $$I = I_0 \sin 2\pi f_0 t \qquad (1)$$

where $I_0$ is the peak value of the input current, $f_0$ is its frequency, $t$ is time, and $\pi$ is the constant 3.1416.

Consider first the vibration modulator 6 and let us suppose that vibration displacement X of armature 33 may be expressed by the equation $$X = X_0 \sin 2\pi f_1 t \qquad (2)$$

where $X_0$ is the peak amplitude of the vibration, $f_1$ is the rotational speed of the rotor 4, and $t$ is time as before.

The voltage output $V_3$ from the vibration modulator is then expressed by the equation $$V_3 = I_0 (\sin 2\pi f_0 t)(C_1 X_0 \sin 2\pi f_1 t) \qquad (3)$$

where $C_1$ is a constant dependent upon the sensitivity of the vibration modulator.

Assuming first that the conductors 38 are connected directly to the wattmeter coil and that the circuit has a resistance $R_3$, then the current $I_3$ in the wattmeter coil is expressed $$I_3 = \frac{V_3}{R_3} = \frac{I_0 C_1 X_0}{R_3}(\sin 2\pi f_0 t)(\sin 2\pi f_1 t) \qquad (4)$$

Similarly, the voltage $V_4$ at the output of the rotation pickup or modulator may be expressed $$V_4 = I_0 (\sin 2\pi f_0 t)[C_2 \sin (2\pi f_1 t + \theta)] \qquad (5)$$

where $C_2$ is a constant dependent on the sensitivity of the rotation modulator and $\theta$ is a phase angle between the position in rotation of the rotor and the vibration detected by the vibration modulator.

Likewise, the current $I_4$ flowing through the wattmeter coil connected to winding 17 may be expressed $$I_4 = \frac{V_4}{R_4} = \frac{I_0 C_2}{R_4} (\sin 2\pi f_0 t)[\sin (2\pi f_1 t + \theta)] \qquad (6)$$

where $R_4$ is the resistance in the circuit of the coil.

The torque T applied to the moving system of the wattmeter is proportional to the product of the currents $I_3$ and $I_4$ and may be expressed $$T = C_3 I_3 I_4 =$$

$$\frac{C_3 I_0 C_1 X_0 I_0 C_2}{R_3 R_4}(\sin 2\pi f_0 t)^2 (\sin 2\pi f_1 t)[\sin (2\pi f_1 t + \theta)] \qquad (7)$$

where $C_3$ is a constant dependent on the sensitivity of the wattmeter coils.

The deflection of the index member of meter W is proportional to this torque T. However, the moving system of the meter W has certain inertia. Therefore, the frequency of the applied torque, as well as its magnitude determines the extent of the deflection and of the indication of the instrument. It is, therefore, desirable to consider each frequency separately.

The equation for torque T may then be rewritten as follows:

$$T = \frac{C_1C_2C_3I_0^2X_0}{4R_3R_4}\cos\theta -$$
$$\frac{C_1C_2C_3I_0^2X_0}{4R_3R_4}\cos(4\pi f_1 t + \theta) -$$
$$\frac{C_1C_2C_3I_0^2X_0}{4R_3R_4}(\cos\theta)(\cos 4\pi f_0 t) +$$
$$\frac{C_1C_2C_3I_0^2X_0}{8R_3R_4}\cos[4\pi(f_0+f_1)t+\theta] +$$
$$\frac{C_1C_2C_3I_0^2X_0}{8R_3R_4}\cos[4\pi(f_0-f_1)t-\theta]$$

(8)

Equation 8 differs from Equation 7 only in that trigonometric identities have been so employed as to separaate the various frequency components into separate terms.

It will be noted from this equation that only the first term corresponds to a steady applied torque and that all of the other terms are periodic and have average values equal to zero. Thus the first term determines the steady deflection of the index of the instrument while the other terms contribute only to the vibration of the index and not to its steady deflection.

It is desirable to minimize this vibration of the index of the instrument W. The magnitude of the deflection of the index of the instrument is given by the expression $$\alpha = \sum_{i=0}^{\infty} \frac{T_i}{K} \frac{1}{1-\left(\frac{f_i}{f_n}\right)^2} \quad (9)$$

where $T_i$ is the $i^{\text{th}}$ frequency component having frequency $f_i$, K is the spring torque of the spring tending to restore the index to its zero position, and $f_n$ is the natural frequency of vibration of the moving system of the meter.

Substituting Equation 8 into Equation 9 we get $$\text{deflection} = \frac{C_1C_2C_3I_0^2X_0\cos\theta}{4R_3R_4K} -$$
$$\frac{C_1C_2C_3I_0^2X_0}{4R_3R_4K}\frac{1}{1-4\left(\frac{f_1}{f_n}\right)^2}\cos(4\pi f_1 t + \theta) -$$
$$\frac{C_1C_2C_3I_0^2X_0\cos\theta}{4R_3R_4K}\frac{1}{1-4\left(\frac{f_0}{f_n}\right)^2}\cos 4\pi f_0 t +$$
$$\frac{C_1C_2C_3I_0^2X_0}{8R_3R_4K}\frac{1}{1-4\left(\frac{f_0+f_1}{f_n}\right)^2}\cos[4\pi(f_0+f_1)t+\theta] +$$
$$\frac{C_1C_2C_3I_0^2X_0}{8R_3R_4K}\frac{1}{1-4\left(\frac{f_0-f_1}{f_n}\right)^2}\cos[4\pi(f_0-f_1)t-\theta]$$

(10)

From this equation it is at once apparent that if $f_n$, the natural frequency of the moving system of the meter W, be made small as compared with the frequencies $f_1$, $f_0$ or $f_0-f_1$ then all of the terms of the equation become small except the first term corresponding to the steady deflection of the instrument. Thus as a practical matter the deflection reduces to $$\text{deflection} = \frac{C_1C_2C_3I_0^2X_0\cos\theta}{4R_3R_4K} \quad (11)$$

All of the factors in this Expression 11 are characteristics of the measuring apparatus rather than the system being measured, except $X_0\cos\theta$. Those factors may be lumped together into a single constant $C_4$ expressed as $$C_4 = \frac{C_1C_2C_3I_0^2}{4R_3R_4K}$$

whereupon the steady deflection may be expressed as steady deflection $= C_4 X_0 \cos\theta$ (12)

Since $X_0$ is the peak amplitude of the vibration applied to armature 33 and $\theta$ is the phase angle between the position of the rotor of modulator 5 and vibration of the armature 33, this equation is a direct measure of the dynamic unbalance producing such vibration.

The magnitude of the unbalance may be determined from the magnitude of the deflection of instrument W and the angle $\theta$ may be determined from index 25 considered in relation to the direction of the deflection of instrument W.

The Equation 12 is independent of frequency. Thus the measurements may be effected at very low speeds and at any of the speeds at which it is necessary to effect such measurements. If desired, amplifier 39 may be employed to increase the sensitivity of the apparatus where extremely small unbalances are to be determined. Where the machine under test rotates at very low speed, the meter W may employ the mechanism of the usual watt-hour meter, thereby to integrate the effects produced in the meter windings over any extended known time interval as determined by a suitable timing device which may be a clock. Thus very small unbalances may be accurately determined even though the machine under test be operated at a very low speed.

The steady deflection produced by the index of the meter W may, of course, be positive or negative depending upon the phase angle between the voltage induced in winding 17 of rotation modulator 5 and the vibration of armature 33. Thus if the stator 16 of rotation modulator 5 be rotated about the shaft 19, the deflection of the meter W may vary as shown by Fig. 2 in which the deflection of the index of this instrument is plotted as ordinate and the angular position of stator 16 is plotted as abscissa.

In the operation of the instrument the operator may rotate the shaft until the deflection of the instrument shows maximum as at the 90° point on the abscissa of Fig. 2. If he rotates shaft 19 in one direction through the 90° point, the steady deflection will become zero, as indicated at the left of Fig. 2, and if he rotates it 90° in the opposite direction, the deflection will become zero, as indicated at the 180° point on the abscissa of Fig. 2. If he continues to rotate it in this latter direction, the deflection will then increase but in the opposite direction and will finally attain a maximum at the 270° point and will become zero again when the rotor attains the 360° position or returns to the position corresponding to the left-hand portion of Fig. 2.

The angle between the position of index 26 and the direction in which the vibration is measured by vibration modulator 6 when the maximum of the curve of Fig. 2 occurs is equal to the angle between the angular position of rotor 8 and the direction of the unbalance in the radial plane of bearing 2. Thus the position of index 26 provides a criteria for determination of the location at which mass must be added or subtracted to correct the unbalance. However, owing to the difficulty in sensing changes in deflection of the instrument W with changes in the position of rotor 16 at this maximum point of the curve of Fig. 2, the angular direction of the unbalance may not be determined with the precision which is desired. To overcome this difficulty it is preferable to determine the point at which the index of the instrument has zero deflection as at the zero point on the abscissa of Fig. 2. This is determined by noting the angular position of the shaft 19 when the index of the instrument W moves from left to right through its zero position. At this point the deflection changes rapidly with movement of the shaft 19 and said angular position may accordingly be accurately determined. The direction of unbalance is then 90° from the angular position of the shaft at which the zero point is noted. The direction in which the 90° is to be measured depends on the direction of rotation of the shaft.

In initially setting up and calibrating the apparatus it is preferable to apply it to a rotating element having an unbalance in a known direction. A fly wheel having a mass applied at a known position on its periphery may be used.

This position should be chosen with a definite known angular relationship to the position of shaft 11. For example, the mass may be applied at a point on the periphery such that dog 13 points directly at the applied mass. Handle 20 is then adjusted until maximum deflection of meter W occurs. Scale 25, which is calibrated from 0° to 360°, may then be rotated until the zero position corresponds to the position of the index 26. The scale may then be fixed in position. Then the scale 25, cooperating with index 26, constitutes a direct indication of the direction of unbalance when the apparatus is applied to any other rotating element having unbalance in an unknown direction. Of course, in applying the apparatus to any other rotating element the same fixed relationship between the direction of shaft 4 and the position of scale 25 as existed in the initial calibration test should be maintained. When these conditions exist the reading of scale 25 corresponding to the position of index 26 when maximum deflection of meter W occurs is the angle between the direction of the unknown unbalance and the angular position of dog 13. This angle is then used in applying the desired corrections for the unbalance.

Fig. 3 shows a modification of my invention in which the vibration modulator 6 is replaced by an instrument of a different character conventionally indicated at 40. This instrument has three windings 41, 42, and 43 arranged in succession upon the same cylindrical form. Within the form is a mechanical armature 44 which extends through coil 42 and is biased to a position equally within coils 41 and 43. This armature has a probe 44' extending from it against, or attached to, bearing 2 of the machine 1, the dynamic unbalance of the rotor of which is to be measured. Alternating electromotive force is supplied to the winding 42, but since windings 41 and 43 are connected in opposite relation no voltage appears between conductors 45 except in response to vibration of the armature 44. When such vibration occurs, voltage appears between conductors 45 having amplitude varying with the magnitude and phase of the vibration. Of course, the phase of the output voltage is dependent on the direction of the displacement of the armature. This voltage may be amplified by amplifier 46 and supplied to an instrument W$h$ which may, as in Fig. 1, employ the mechanism of a wattmeter or a watt-hour meter.

The form of the invention shown in Fig. 3 also has a rotation modulator which, in this instance, comprises a pair of ordinary selsyn devices 50 and 51, each of which devices comprises the usual distributed stator windings which are connected together by means of three conductors 53. The device 50 has a rotor arranged on shaft 54 adapted to engage the end of the shaft 4 of machine 1 and which is provided with a pin and dog arrangement 13 and 14, as shown in Fig. 1, to be driven by the rotation of the shaft 4 and to be maintained in an angular position the same as shaft 4. Alternating electromotive force is supplied to the rotor winding of the selsyn device 50 from a suitable source of electromotive force connected to conductors 55. This electromotive force, due to the rotation of the rotor, generates an electromotive force in the distributed stator winding thereof, which electromotive force is supplied through conductors 53 to the stator winding of the selsyn device 51, which winding produces a field within the stator of the selsyn device 51. The rotor of this selsyn device is adapted to be held stationary in any angular position and is provided with an index member 56 rotatable over a dial 57 in accordance with the position of the rotor. The electromotive force which appears in this winding is dependent upon the position of the rotor within the stator of selsyn device 51 and is directly related to the position in rotation of shaft 4. This voltage is supplied through conductors 58 to the opposite winding of the meter W$h$.

The operation of this system is similar to that previously described except that the readings are obtained by observing the indication of the meter over a known interval as noted by the clock 60 shown on the drawing.

The electromotive force generated in the rotor winding of selsyn device 51 has the same character of modulation with respect to the rotation of rotor 4 as has the output from modulator 5 of Fig. 1. If it be assumed that shaft 54 is stationary and the rotor winding of device 50 is energized from conductors 55, electromotive forces are induced in the stator of device 50 producing voltages of such phase and amplitude between conductors 53 and in the stator winding of selsyn 51 that if the rotor of selsyn 51 be in a certain definite position corresponding to the position of the rotor of device 50 maximum voltage is induced in it. If the rotor of device 50 be rotated in either direction from that position, the voltage induced in the rotor winding of device 51 is reduced and becomes zero when the position of device 50 reaches a position 90° removed in either direction from its original position. On further movement of the rotor of device 50 the voltage in the rotor of device 51 again increases until it becomes a maximum of opposite phase at the 180° position of rotor of device 50. Thus this voltage induced in the winding of rotor 51 is modulated in accord with the rotation of the rotor of device 50 just as is the voltage in winding 17 of device 5 of Fig. 1 modulated by rotation of rotor 8.

The arrangement of Fig. 3 has the advantage that the effect produced by movement of crank 20 in Fig. 1 in varying the time phase relation of the modulation of the output may be produced, in Fig. 3, by rotation of the rotor of device 51. The position of this rotor may be indicated on the calibrated scale 57. This device 51 may be located where the indications are to be made which may be at some distance from the machine under test.

One of the advantages in the use of an instrument employing the mechanism of a wattmeter, or watt-hour meter, resides in its ability to differentiate between undesired signals and components such as extraneous vibrations due to vibration of the building in which the equipment may be located or extraneous electromotive forces which may be induced in the equipment from electrical apparatus in the vicinity, etc. These extraneous vibrations produce a vibration or oscillation of the index of the instrument but do not change the steady component of its deflection. These vibrations of the index may be reduced by designing the moving system of the wattmeter mechanism to have a resonant frequency low as compared with the rotational frequency of the machine under test. The meter is thus able effectively to average out signals whose frequencies are high compared with the resonant frequency of the moving system of the meter. It is necessary, therefore, where the dynamic unbalance of apparatus running at extremely low rotational speeds is to be determined by an instrument of this character that the resonant frequency of the moving system of the instrument be extremely low. However, there is a lower limit to the natural frequency practical in such systems.

By the use of the watt-hour meter mechanism as shown in Fig. 3, this averaging out may be effected over a longer period of time, i. e. for a period of time of such length that the extraneous signals referred to can be made unimportant even when the rotational frequency of the machine under test is very much less than the lowest practical resonant frequency of the moving mechanism of a wattmeter.

The initial calibration of the apparatus of Fig. 3 is the same as described in connection with Fig. 1 assuming that conductors 53 are properly connected. Just as it is necessary in the apparatus of Fig. 1 to maintain a fixed relationship between the position of dial 25 and the angular position of shaft 4, so in Fig. 3 a fixed relation is maintained between shaft 54 and the stator of selsyn 50 and also a fixed relation must be maintained between the position of dial 57 and the stator of selsyn 51.

Fig. 4 shows an arrangement similar to that of Fig. 3 except that it employs a vibration modulator 6 of the same character shown in Fig. 1 and in which the rotation modulator 5 of Fig. 1 is replaced by the selsyn device 50 as shown in Fig. 3. However, the stator of this selsyn device, which comprises the distributed windings represented at 61, 62, and 63, is connected to the corresponding stator windings of two additional selsyn devices 70 and 80. Thus as the rotor 64 of the selsyn device 50 rotates within the stator 61, 62, 63, electromotive forces are generated in the stator and are supplied to the stators of the selsyn devices 70 and 80 to produce fields therein. These latter stators have rotors 71 and 81 therein which are normally restrained against rotation but which may be adjusted to any desired angular position and which are arranged on a common shaft 90 having an index 92 which cooperates with a scale 93 to indicate the position of the rotors. Rotor 71 is connected to one of the coils of a meter 95, the other coil of which is connected through conductors 96 to the output windings of the modulator 6. The rotor 81 of selsyn device 80 is similarly connected through a switch 97 to one of the windings of a meter 98, the other winding of which is connected through conductors 96 to said output winding of vibration modulator 6. Both of the two meters 95 and 98 which have the mechanism of watt-hour meters have reset buttons 95' and 98' which, when pressed, reset the meter to a zero reading. In addition, switch 97 is operated by means of a timer 100 having an index 101 which is rotatable in a clockwise direction by a knob 102 to any desired time interval for which it may be set and in which position it remains until released by operation of a control member 102' which may be an ordinary pushbutton. It then returns at a constant rate to its normal position during the time interval for which it has been set. When it reaches its initial position it operates the switch 97 to the open position thereby stopping the meter 98.

Thus in the operation of this system the operator operates the shaft 90 until the moving element of meter 95 is at rest. He then knows that the position of the rotor 71 corresponds to the position indicated at zero or 180° in Fig. 2. He can determine which of these two positions the position of the rotor 71 corresponds to by observing the direction of rotation of the rotating element of the meter 98 upon slight movement of the motor from the position where the meter is at rest. Having determined that the rotor 71 is in the position corresponding to the zero position in Fig. 2, he then knows that the rotor 81 is in the position corresponding to 90° in Fig. 2 since the two rotors 71 and 81 are at right angles to each other. Thus the rotating element of meter 98 is operating at its maximum rate. The operator then sets the index 101 of the timer 100 to a predetermined time interval on the scale 103, which may be several seconds, minutes, or even hours, as he desires, and then presses the control member 102 so that the timer gradually returns to its initial position. On expiration of the predetermined time interval for which the timer is set, the index 101 reaches the initial position and then switch 97 is automatically opened. The reading of the meter 98 may then be divided by the time interval and the quotient taken as a measure of the dynamic unbalance of the rotor being tested.

In this way it will be observed that extremely minute unbalances of the rotor of the machine 1 may be detected since the effect of the vibration produced is integrated in the meter 98 over any desired interval of time and determined by the reading of the meter. In addition, any extraneous effects upon the apparatus, such as are produced by the vibration of the building in which it is located, extraneous local fields, etc. are averaged out over the interval and the effect upon the final reading minimized.

Fig. 5 shows an arrangement which may be used in the same way as the arrangement in Fig. 4 and differs from the arrangement of Fig. 4 only in that the rotor windings 71 and 81 of Fig. 4 are placed upon the same rotating element within a single stator, the rotor windings being arranged at an angle of 90° with respect to each other on the rotating element. In this way only a single stator is employed. Thus in place of the two selsyn devices 70 and 80 of Fig. 4, a single selsyn device 110 is used having two rotor windings 71 and 81 arranged upon the single rotating element but at right angles to each other.

In considering the different modulators described, it will be noticed that they are all two way devices. That is, whereas they are shown as having electromotive force applied to one winding and as producing a modulated electromotive force in an output winding, any of these devices are reversible, i. e. the electromotive force may be applied to either winding and the voltage induced in the other winding may be applied to the indicating instrument to produce the desired indication of unbalance. Either or both of these modulators in any of the arrangements of Figs. 1, 3, 4, or 5 may be so reversed and still obtain the unbalance indication obtained by the meter W, or W$h$.

Moreover, it will be observed that these modulators, and the meter itself, each operate as simple multipliers of two vectorial factors, i. e. the modulator 5 of Fig. 1 multiplies the applied electromotive force by the angle of rotation of rotor 4 (see Equation 6 above), the modulator 6 multiplies the applied electromotive force by the vibration (see Equation 4 above), and the meter multiplies the products of the first two multiplications (see Equation 7 above). The final indication, which is dependent on the torque T expressed by Equation 7 is independent of the order in which the multiplications are effected so long as the factors present in Equation 7 are present in the final product. Thus, for example, the modulators may be connected in cascade, i. e. the product, or output, produced by either modulator 5 or 6 in Fig. 1 may be applied to the input of the other modulator of that figure and the output of such modulator applied to a winding of the meter W, the sine wave voltage on conductors 7 being applied directly to the other winding of meter W. Thus all of the multiplications are effected in somewhat different order with the result that all of the factors are present in the final equation for torque and the indication of the instrument is the same.

These various modifications of my invention appear from Fig. 6 where I have indicated by rectangle 6' a vibration modulator, by rectangle 5' the rotation modulator, and by rectangle W the indicating instrument. These various instrumentalities are connected in a closed loop by the different pairs of conductors 115, 116, and 117.

The applied electromotive force may be impressed between, or in series with, any pair of these conductors 115, 116, 117. I have indicated on the drawing sources 7', 7'', and 7''', each arranged to be connected through a corresponding switch 117', 115', 116' between the corresponding pair of conductors 117, 115, 116. The meter W produces the same indication when any one of the different switches is closed. Similarly, the meter W may be connected in the opposite side 115 of the loop.

While I have shown particularly embodiments of my invention, it will, of course, be understood that I do not wish to be limited thereto. Its various arrangements, both as to circuit arrangements and the instrumentality, may be made and I contemplate by the appended claims to cover any modifications which fall within the true spirit and scope of my invention.

What I claim as new and desire to secure by Letters Patent of the United States is:

1. In a system for indicating unbalance in a rotating member, the combination of an instrument having a movable element and a pair of input means, the motion of said element being in proportion to the product of currents in said input means, a source of sine wave electromotive force, and separate means energized by said source of electromotive force and respectively responsive to vibration and rotation of said member producing and applying to said input means respectively two currents the product of which is proportional to the product of the square of said sine wave electromotive force, the vibration of said member in a predetermined direction, and the position of said member in its rotation.

2. In a system for indicating unbalance in a rotating member, the combination of an instrument having a movable element and a pair of input means, the motion of said element being in proportion to the product of currents in said input means, a source of sine wave electromotive force, means energized by said source of electromotive force and responsive to vibration of said members producing and applying to one of said input means a voltage proportional to the product of said sine wave electromotive force and the vibration of said element in a predetermined radial direction, means energized by said source of electromotive force and responsive to rotation of said member producing and applying to the other of said input means a voltage proportional to the product of said sine wave voltage and the position in rotation of said element whereby the motion of the movable element of said instrument is proportional to the product of the square of said sine wave electromotive force, said vibration and said position in rotation of said member.

3. In a system for indicating unbalance of a rotating element, the combination of a source of an alternating electromotive force, an instrument having a pair of windings and an element movable in proportion to the product of the currents in said windings, means modulating said electromotive force in amplitude in accord with the angular position of said rotating element and supplying said modulated electromotive force to one of said windings, and means modulating said electromotive force in accord with the displacement of said rotating element due to vibration produced by said unbalance during rotation of said element and supplying said last-mentioned modulated electromotive force to the other winding.

4. In a system for indicating unbalance of a rotating element, the combination of a source of alternating electromotive force, an instrument having a pair of input circuits and means to produce an indication proportional to the product of the currents in said input circuits, means modulating said electromotive force in amplitude in accord with the angular position of said element and supplying said modulated electromotive force to one of said input circuits, and means modulating said electromotive force in accord with the displacement of said element due to vibrations produced by said unbalance during rotation thereof and supplying said last-mentioned modulated electromotive force to the other of said input circuits.

5. In a system for indicating unbalance of a rotating element, the combination of a pair of electromagnetic induction devices each having an input winding connectable to a source of alternating electromotive force and an output winding, one of said devices being responsive to rotation of said element and when connected inducing an alternating voltage in its output winding modulated in amplitude in accord with the angle of rotation of said element, the other of said devices being responsive to vibration of said element and when connected inducing an alternating voltage in its output winding modulated in amplitude and phase dependent on the magnitude and direction of the vibration of said element due to unbalance, and instrument means connected to said output windings and responsive to the relation between the voltages induced in said output windings to indicate the unbalance of said element.

6. In a system for indicating unbalance of a rotating element, the combination of a pair of amplitude modulators, each having input and output circuits, means to supply alternating voltage to both of said modulators, said modulators when supplied with said alternating voltage producing in their respective output circuits alternating voltage with amplitude modulation, one of said modulators being responsive to rotation of said element and producing alternating voltage of amplitude dependent on the position in rotation of said element and the other being responsive to vibration of said element and producing alternating voltage with amplitude dependent on the vibration of said element due to unbalance, and instrument means connected to said output circuits and responsive to the relation between the voltages in said two output circuits to indicate said unbalance.

7. In a system for indicating unbalance of a rotating element, the combination of a pair of modulators, each having an armature, the armature of one modulator being adapted to be rotated with said element and the armature of the other being adapted to be vibrated in accord with the vibration of said element, means to supply alternating electromotive force to each modulator to be reproduced thereby with modulation, each modulator having zero output when the armature is in a certain static position and increasing output as it moves in either direction from said position, the output voltage having one phase when the armature moves from said static position in one direction and opposite phase when it moves in the opposite direction, and an indicating instrument connected to receive said output voltages and responsive to the intensity of the components of the output voltages of said modulators that are in phase with each other.

8. The combination, in a system for indicating unbalance of a rotating element, of an instrument having a pair of windings and a moving mechanism subject to a torque proportional to the product of the currents in said two windings, a source of alternating electromotive force, means modulating and supplying said alternating electromotive force to each winding, the modulation of the electromotive force supplied to one winding being in accord with the position in rotation of said element and modulation of the electromotive force supplied to the other winding being in accord with the vibration of said element in a predetermined direction, the natural resonant frequency of said moving mechanism being so low relative to the rotational speed of said element that the movement of said moving mechanism due to said torque is dependent on the magnitude of said vibration and the angle between the direction of the unbalance and said predetermined direction, and is independent of the rotational speed of said element.

9. The combination, in a system for indicating the magnitude and direction of unbalance in a first element rotating at low speed, of an instrument having a pair of windings and an element rotatable at a speed proportional to the product of the currents in said windings, and means energizable from a source of electromotive force and responsive to vibration of said first element producing and supplying to one of said windings when energized a current proportional to $X_0 (\sin 2\pi f_0 t)(\sin 2\pi f_1 t)$ and means energizable from said source of electromotive force and responsive to rotation of said first element producing and supplying to the other winding when energized a current proportional to $(\sin 2\pi f_0 t)[\sin (2\pi f_1 t + \theta)]$ where $X_0$ is the peak amplitude of vibration of said first element in a predetermined direction, $f_0$ is the constant frequency of said source of electromotive force and higher than the rotational frequency of said first element, $f_1$ is the rotational frequency of said first element, $\theta$ is the angle determined by the relation between the position in rotation of said element and the direction of the unbalance to be indicated, and $t$ is time.

10. The combination, in a system for indicating the dynamic unbalance of a rotating element, of a source of carrier current, means to modulate said carrier current in accord with the vibration of said element, a pair of selsyn devices each having a stator having a winding thereon and a rotor having a winding, said stator windings being connected together to produce fields in corresponding directions within said stator windings, means to supply said carrier current to one of said rotor windings thereby producing a field in the corresponding direction within the other stator, means to rotate one of said rotors synchronously with the rotation of said element, an indicating instrument having two windings and an element movable in predetermined relation to the product of the currents in said two windings, and means to supply said modulated current to one winding of said indicating instrument, the other winding of said instrument being connected to the winding of the second rotor.

11. The combination, in a system for indicating the dynamic unbalance of a rotating element, of means to produce an alternating current modulated in accord with the vibration of said element, a pair of selsyn devices each having a stator having a winding thereon and one of said devices having a rotor having a winding and the other of said devices having a rotor having two windings at right angles to each other, said stator windings being connected together to produce fields in corresponding directions in both stators, means to supply alternating current having the frequency of said first current to the winding on the rotor of said one device, means to rotate said last rotor synchronously with rotation of said element, a pair of indicating instruments each having two windings and an element movable in predetermined relation to the product of the currents in said two windings, means to supply said modulated alternating current to one winding of each instrument and means to connect the other windings of said instruments to the different respective windings on the rotor of said other selsyn device.

12. The combination, in a system for indicating the dynamic unbalance of a rotating element, of means to produce an alternating current modulated with the vibration of said element, three selsyn devices having stator windings connected together to have fields in corresponding directions within said device, and each having a rotor having a winding, the rotor of one of said devices being adapted to be driven synchronously with the rotation of said element and the rotors of the other devices being mechanically connected together with the rotor windings at right angles to each other, a pair of indicating instruments, each having two windings and an element movable in predetermined relation to the product of the currents in said two windings, means to supply said modulated alternating current to one winding of each instrument, the other windings of said instruments being connected to the different respective rotor windings of said other selsyn devices.

13. In a system for indicating unbalance in a rotating member, the combination of an instrument having a movable element and a pair of input means, the motion of said element being in proportion to the product of currents in said input means, a source of sine wave electromotive force, and a pair of modulators, each modulator having an input circuit and an output circuit, said modulators being connected in cascade, one modulator being responsive to the vibration of said member and producing in its output circuit a voltage proportional to the product of the voltage applied to its input circuit and the vibration of said member in a predetermined radial direction and the other modulator being responsive to rotation of said member and producing in its output circuit a voltage proportional to the product of the voltage applied to its input circuit and the position in rotation of said member, and means to apply said sine wave electromotive force to the first input circuit in said cascade and to one input means of said instrument, the output circuit of said cascade being connected to the other input means of said instrument.

14. In a system for indicating unbalance of a rotating element, the combination of an instrument having a pair of windings and an element movable in proportion to the product of the currents in said windings, means connectable to a source of electromotive force and responsive to rotation of said element and when connected modulating said electromotive force in amplitude in accord with the angular position of said rotating element and supplying said modulated electromotive force to one of said windings, and means connectable to said source of electromotive force and responsive to vibration of said element and when connected modulating said electromotive force in accord with the displacement of said rotating element due to vibration produced by said unbalance during rotation of said element and supplying said last-mentioned modulated electromotive force to the other of said windings.

15. In a system for indicating unbalance in a rotating member, the combination of an instrument having a movable element and a pair of input means, the motion of said element being in proportion to the product of currents in said input means, a source of sine wave electromotive force, a pair of modulators each having an input circuit and an output circuit, one of said modulators being responsive to the vibration of said member and producing in its output circuit a voltage proportional to the product of the voltage applied to its input circuit and the vibration of said member in a predetermined radial direction and the other of said modulators being responsive to rotation of said member and producing in its output circuit a voltage proportional to the product of the voltage applied to its input circuit and the position in rotation of said member, and means including different pairs of conductors connecting said pair of instrument input means and said input and output circuits of said modulators in a closed loop with said source of sine wave electromotive force connected for energizing one of said pairs of conductors.

References Cited in the file of this patent

UNITED STATES PATENTS

| | | |
|---|---|---|
| 2,362,842 | Mueller | Nov. 14, 1944 |
| 2,363,373 | Werner | Nov. 21, 1944 |
| 2,446,567 | White et al. | Aug. 10, 1948 |
| 2,467,582 | Corkran | Apr. 19, 1949 |
| 2,469,137 | Strong | May 3, 1949 |
| 2,616,289 | Kleckner | Nov. 4, 1952 |